Feb. 21, 1967   R. G. HARTENSTEIN   3,305,801
VARIABLE TIME CONSTANT SMOOTHING CIRCUIT
Filed Aug. 6, 1964
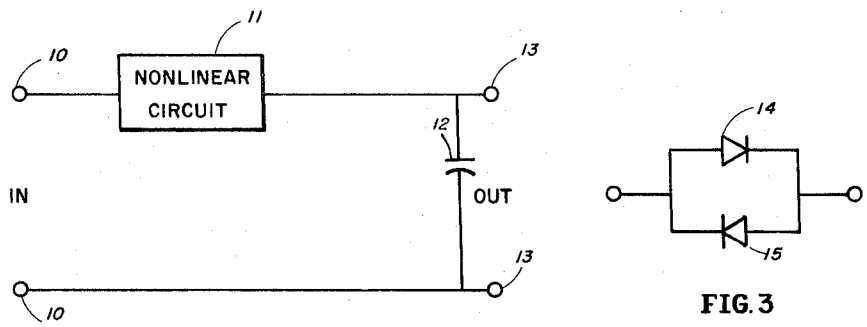
FIG.1
FIG.3
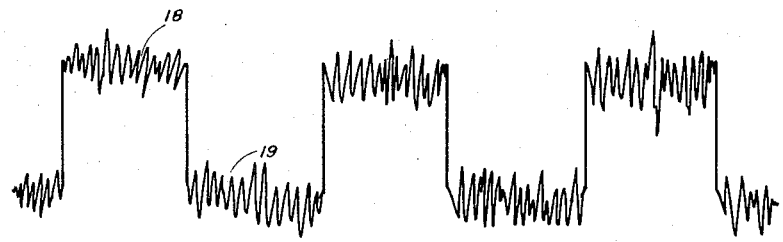
FIG.4
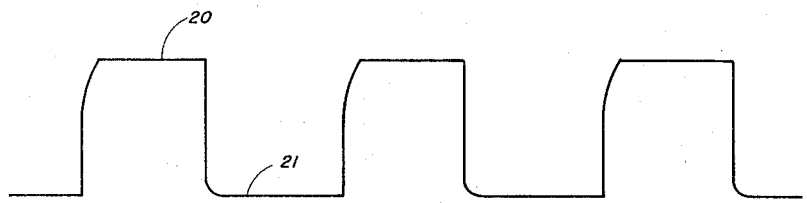
FIG.5
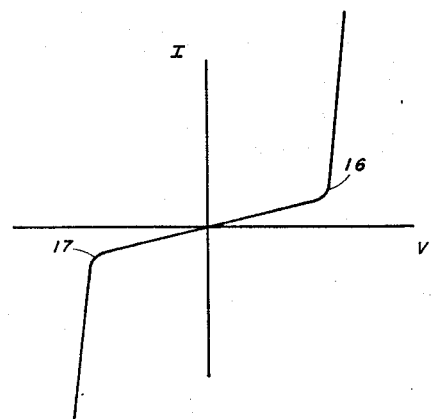
FIG.2
INVENTOR.
RAYMOND GEORGE HARTENSTEIN
BY
*G. H M<sup>c</sup>Coy*
*Leonard Rawi*
ATTORNEYS ns Patent Office
3,305,801
Patented Feb. 21, 1967

3,305,801
VARIABLE TIME CONSTANT SMOOTHING CIRCUIT
Raymond George Hartenstein, Seabrook, Md., assignor to the United States of America as represented by the Administrator of the National Aeronautics and Space Administration
Filed Aug. 6, 1964, Ser. No. 388,023
2 Claims. (Cl. 333—79)

The invention described herein may be manufactured and used by or for the Government of the United States of America for governmental purposes without the payment of any royalties thereon or therefor.

This invention relates generally to smoothing networks and more particularly to a smoothing network incorporating a non-linear circuit for removing noise from pulse signals.

Smoothing networks have, in recent years, found application in pulse modulated telemetry receivers and transponders used in space vehicles and in earth based pulse telemetry equipment. Smoothing circuits have been extensively used to eliminate noise from pulse signals received by the space vehicle and to eliminate noise from pulse signals received by earth based telemetry equipment. Advantages characteristic of the smoothing network reside in the removal of unwanted noise which result in the creation of a constant level pulse prior to sampling the information contained in a pulse chain. However, smoothing networks are not limited to use in spacecraft telemetry systems, but are usfeul in other environments, for example, smoothing the pulse input to pulse measuring instruments in conventional measuring circuits. The smoothing network is also useful in conventional telemetry equipment. For example, when a pulse chain is transmitted along a coaxial transmission line noise from the system and from the line are picked up by the pulse chain. By passing the output from the line through a smoothing network the noise is eliminated and the information contained in the pulse chain is easily recovered.

A pulse signal source generates a relatively clean pulse and the transmission medium through which the signal is transmitted adds noise to the pulse chain. When the signal is received, additional noise is added in the receiver circuitry. It is necessary, prior to sampling the pulse signals, to have this noise removed so that the output from the signal sampling device can give an accurate indication that a pulse signal does or does not exist. If the noise is retained by the pulse an inaccurate indication of whether the pulse does or does not exist will result since in many telemetry systems, particularly in low power spacecraft systems, the magnitude of the random noise voltage may be of an order of magnitude approaching that of the pulse voltage.

A disadvantage of previously developed smoothing networks is the complexity necessary to eliminate noise over a wide range. A further disadvantage of previously developed smoothing networks is their failure to operate on highly repetitive pulse chains, due to their inherently slow rise time, without the use of highly complex circuits. It is imperative that a smoothing network, to operate on a highly repetitive pulse chain, have a fast rise time and yet provide an effective time constant low enough to eliminate noise over the majority of the frequency spectrum. In addition, such a network should be small, simple and easily designed.

Accordingly, it is an object of the present invention to provide a new and improved smoothing network.

Another object of the present invention is to provide an improved wide frequency range smoothing network.

A further object of the instant invention is to provide a smoothing network having a frst rise time which operates over a wide frequency range for the removal of noise from pulse chains.

The foregoing and other objects are attained in the instant invention by providing a simple network incorporating a non-linear circuit in series with a capacitor element. The input is connected across the series network, and the output is taken across the capacitor element. With the network functioning in this manner, the major rejection will occur in the higher frequencies and over a relatively wide frequency range.

Obviously then, the corner frequency will depend both upon the value of the capacitor component used as well as the effective resistance of the non-linear circuit. An example of a non-linear circuit which will operate in the required manner is a pair of diodes connected in parallel in a back-to-back relationship. This circuit, operating in conjunction with the series capacitor element, has a fast rise time and also provides smoothing action as is characteristic of a low pass filter.

It can be readily seen that the foregoing basic circuit technique can be used with any non-linear circuit having the correct characteristic in conjunction with a capacitor Other objects and many of the attendant advantages of this invention will be readily appreciated as the same becomes better understood by reference to the following detailed description when considered in conjunction with the accompanying drawings, wherein:

FIG. 1 is a block diagram of the improved smoothing circuit of the instant invention;

FIG. 2 is a graph representing the V–I characteristic of the non-linear circuit required for the operation of the instant invention;

FIG. 3 is a typical non-linear circuit meeting the requirements of the instant invention;

FIG. 4 is a wave diagram representing a pulse chain applied to the input of the circuit of FIGURE 1 and having noise superimposed thereon; and FIG. 5 is a wave diagram representing the same pulse chain as it appears at the output of the circuit of FIGURE 1 with the noise substantially removed.

Referring now to the drawings, the novel smoothing network of the instant invention is shown in block diagram form in FIG. 1 as comprising a non-linear circuit 11 and a capacitor element 12. An input signal is applied to the input terminals 10 which are across the series combination of a non-linear circuit 11 and a capacitor element 12. The output terminals 13 of the smoothing network of FIG. 1 are across the capacitor element 12.

Obviously, the non-linear circuit 11 must have peculiar characteristics to provide the unusual result accomplished by the instant invention. The V–I characteristics necessary to accomplish the results herein disclosed is shown by FIG. 2. The V–I characteristics of the non-linear circuit necessary to result in the instant invention requires a peculiar characteristic in the first and third quadrants of a Cartesian co-ordinate system. The first and third quadrant curves are identical. In both quadrants, the curve goes first through a high resistance region then through a low resistance region. Consequently, there are sharp knees 16 and 17 in the curve. It is the high resistance region both in the first and third quadrants which provides the rejection capability of the invention. The low resistance region provides the fast switching ability of the invention.

A very simple circuit that generates the V–I characteristic of the non-linear circuit is shown in FIG. 3. A pair of identical diodes 14 and 15 are connected in parallel in a back-to-back relationship. This circuit results in a V–I characteristic of the nature shown in FIG. 2. The back-to-back diodes 14 and 15 result in a variable resistance which has the peculiar characteristics that the first quadrant curve has first a high resistance region followed by a sharp knee 16 into a low resistance region. In the reverse direction there is also a high resistance region to a knee 17 after which is a low resistance region. Ideally, of course, the high resistance would be infinite and the low resistance would be zero.

FIG. 4 discloses a typical input pulse chain prior to smoothing by the instant invention. Noise is superimposed on the chain both at the plateau of the pulse 18 and during the period between pulse occurrences 19. After the signal has passed through the smoothing network disclosed in the instant invention and shown in FIG. 1 the output results in a smooth signal, shown in FIG. 5. The output from the smoothing network has a smooth plateau 20 as well as a smooth level between pulse occurrences 21.

Turning now to a discussion of the voltage level of the noise which the smoothing circuit will reject; the voltage level above which the instant invention will pass noise is determined by the voltage level above the knees 16 and 17, shown in the curve of the V–I characteristic of the non-linear circuit, FIG. 2. The network will reject only noise that has a voltage between the knees 16 and 17 of the non-linear circuit V–I characteristic curve. The instant invention only operates to reject noise within this voltage level and will pass noise that has a voltage above this level. Consequently, the type of non-linear circuit and the operating voltage level will determine the extent of voltage rejection. It should be pointed out that in most cases the noise voltage superimposed on the pulses is of a small magnitude and easily rejected by the instant invention. However, the circuit will operate with low pulse voltages and high noise voltages.

There will now be presented a brief explanation of how the smoothing circuit performs when the magnitude of the applied voltage to non-linear circuit 11 falls outside the region between the knees 16 and 17 of the V–I characteristic curve of FIGURE 2. When the magnitude of the applied voltage, either in the positive or negative direction, exceeds the voltage level at the knees 16 and 17 of the V–I characteristic curve, one of the diodes, depending on the polarity of the applied signal, is forward biased. In this condition, this diode behaves as a low resistance and capacitor 12 charges very quickly as in a peak detector circuit. Now, once the capacitor is charged sufficiently, the diode returns to a nearly non-conducting state (the region between the knees 16 and 17) and behaves as a high resistance. The smoothing circuit in this condition again provides, as previously discussed, the long time constant filtering action.

It will therefore be seen, upon consideration of the above disclosure, that a simple smoothing circuit having a wide frequency range providing for the rejection of noise signals superimposed on a pulse chain has been provided. The output being in clean form is easily sampled by the receiving system.

Obviously, numerous modifications and variations of the instant invention are possible in light of the above teachings. It is therefore to be understood that within the scope of the appended claims, the invention may be practiced otherwise than described herein.

What is claimed and is new and desired to be secured by Letters Patent of the United States is:

1. A pulse smoothing network comprising: the combination of a non-linear circuit in series with a capacitor element for eliminating random noise from a pulse input signal; said non-linear circuit having a V–I characteristic curve with a high resistance slope to a knee followed by a low resistance slope in the first quadrant and a high resistance slope to a knee followed by a low resistance slope in the third quadrant of a Cartesian co-ordinate system; the input to said network being applied to said series combination; and the output from said network being taken across said capacitor element.

2. The apparatus set forth in claim 1 wherein the non-linear circuit comprises a pair of diodes connected in parallel in a back-to-back relationship.

References Cited by the Examiner

UNITED STATES PATENTS 2,122,748  7/1938  Mayer _____ 307—88.5
2,771,586  11/1956  Di Toro _____ 328—167

OTHER REFERENCES

Olson, Harry F.: "Audio Noise Reduction Circuits," Electronics, vol. 20, No. 12, December 1947, pp. 118–122, 325–473.

HERMAN KARL SAALBACH, *Primary Examiner.*

M. NUSSBAUM, *Assistant Examiner.*